United States Patent
Karame et al.

(10) Patent No.: US 10,868,835 B2
(45) Date of Patent: Dec. 15, 2020

(54) METHOD FOR MANAGING DATA TRAFFIC WITHIN A NETWORK

(71) Applicant: NEC Laboratories Europe GmbH, Heidelberg (DE)

(72) Inventors: Ghassan Karame, Heidelberg (DE); Felix Klaedtke, Heidelberg (DE); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/343,006

(22) PCT Filed: Oct. 24, 2016

(86) PCT No.: PCT/EP2016/075537
§ 371 (c)(1),
(2) Date: Apr. 18, 2019

(87) PCT Pub. No.: WO2018/077376
PCT Pub. Date: May 3, 2018

(65) Prior Publication Data
US 2020/0059495 A1    Feb. 20, 2020

(51) Int. Cl.
*H04L 29/06* (2006.01)
*H04L 12/24* (2006.01)

(52) U.S. Cl.
CPC .......... *H04L 63/20* (2013.01); *H04L 41/0816* (2013.01); *H04L 41/0893* (2013.01); *H04L 63/0263* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,735,116 B1 * | 6/2010 | Gauvin | G06F 21/552 726/2 |
| 9,231,955 B1 | 1/2016 | Mehresh et al. | |
| 2003/0055962 A1 * | 3/2003 | Freund | H04L 63/104 709/225 |
| 2008/0235755 A1 | 9/2008 | Blaisdell et al. | |
| 2010/0195503 A1 * | 8/2010 | Raleigh | H04L 41/0806 370/235 |
| 2013/0080607 A1 * | 3/2013 | Raleigh | G06Q 30/0284 709/221 |
| 2019/0385057 A1 * | 12/2019 | Litichever | H04L 63/1416 |

* cited by examiner

Primary Examiner — Davoud A Zand
(74) Attorney, Agent, or Firm — Leydig, Voit & Mayer, Ltd.

(57) ABSTRACT

A method manages data traffic within a network having controllers that each control a part of the network having a forwarding element (FE), the controllers being connected to a reference monitor (RM) for enforcing a security policy. The method includes: receiving a rule request by a controller and transmitting it its RM; the RM checking the rule request for policy compliance and authorizing a poly compliant part of the rule request. When the rule request has an outside modification: the controller contacts controllers impacted by the outside modification for obtaining an authorization, and upon receipt of authorization, sending the controller sends the modifications and authorizations to the impacted controllers to implement the modification in their FE.

17 Claims, 3 Drawing Sheets

METHOD FOR MANAGING DATA TRAFFIC WITHIN A NETWORK

CROSS-REFERENCE TO PRIOR APPLICATIONS

This application is a U.S. National Stage Application under 35 U.S.C. § 371 of International Application No. PCT/EP2016/075537 filed on Oct. 24, 2016. The International Application was published in English on May 3, 2018 as WO 2018/077376 under PCT Article 21(2).

FIELD

The present invention relates to a method for managing data traffic within a network.

BACKGROUND

Sharing network resources with user groups, divisions, or even other companies in software defined networking (SDN) is gaining increasing attention recently owing to its promises for better network utilization. Resource sharing is effectively realized in SDN by empowering these parties at the control plane with permissions for administrating network components or parts thereof. Different tenants can lease a network part, e.g. a network slice and therefore share the network resources. For scalability and security reasons, each of the network parts has its own dedicated network controller. Smaller portions of the network can be managed more efficiently in general. Furthermore, an attacker only gains control of the network parts of the corresponding controllers it has compromised. The controllers of the network parts might run in virtualized environments (e.g. virtual machines or containers) on top of a hypervisor.

Each of the controllers may have its own security policies and enforcement mechanisms for administrating the resources of the network slice, which may be virtualized, for example, a security policy could restrict the kind of flow rules that a network application running on top of the controller can install in a virtual switch of the slice. A reference monitor—as e.g. described in the non-patent literature of F. Klaedtke, G. O. Karame, R. Bifulco, and H. Cui, "Access control for SDN controllers," Proceedings of the 3rd SIGCOMM Workshop on Hot Topics in Software Defined Networking (HotSDN) (2014); and F. Klaedtke, G. O. Karame, R. Bifulco, and H. Cui, "Towards an access control scheme for accessing flows in SDN," Proceedings of the 1st IEEE Conference on Network Softwarization (NetSoft) (2015)—can, e.g. be used to enforce such kind of policies by controlling the access to these resources. The present inventors have recognized that installation or the deletion of a flow rule in a switch of a slice however might also have an impact on network flows in other slices. As a consequence, the installation or the deletion of a flow rule needs also to be checked against the policies of other slices. Such additional policy checks should not be done by the controller's reference monitor of a single slice, because the outcome of such a check is not trustworthy.

SUMMARY

An embodiment of the present invention provides a method for managing data traffic within a network, the network having controllers, each of the controllers being configured to control a corresponding part of the network having at least one forwarding element (FE) for forwarding data within the network, each of the controllers being connected to at least one reference monitor (RM) for enforcing a security policy for the network part managed by the corresponding one of the controllers. The method includes: receiving a rule request by a controller of the controllers and transmitting the rule request to the corresponding RM, checking, by the RM, the rule request for policy compliance, and authorizing, by the RM, a part of the rule request that is policy compliant. When the rule request includes an outside modification, the outside modification impacting at least one other network part not managed by the controller: the controller contacts at least the one or more controllers being impacted by the outside modification for obtaining an authorization for the outside modification, and upon reception of the one or more authorizations for the outside modification, sending all modifications of the rule request and corresponding authorizations by the controller to all other controllers being impacted by the rule request for implementing the modification in the corresponding at least one FE of each of the controllers impacted.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
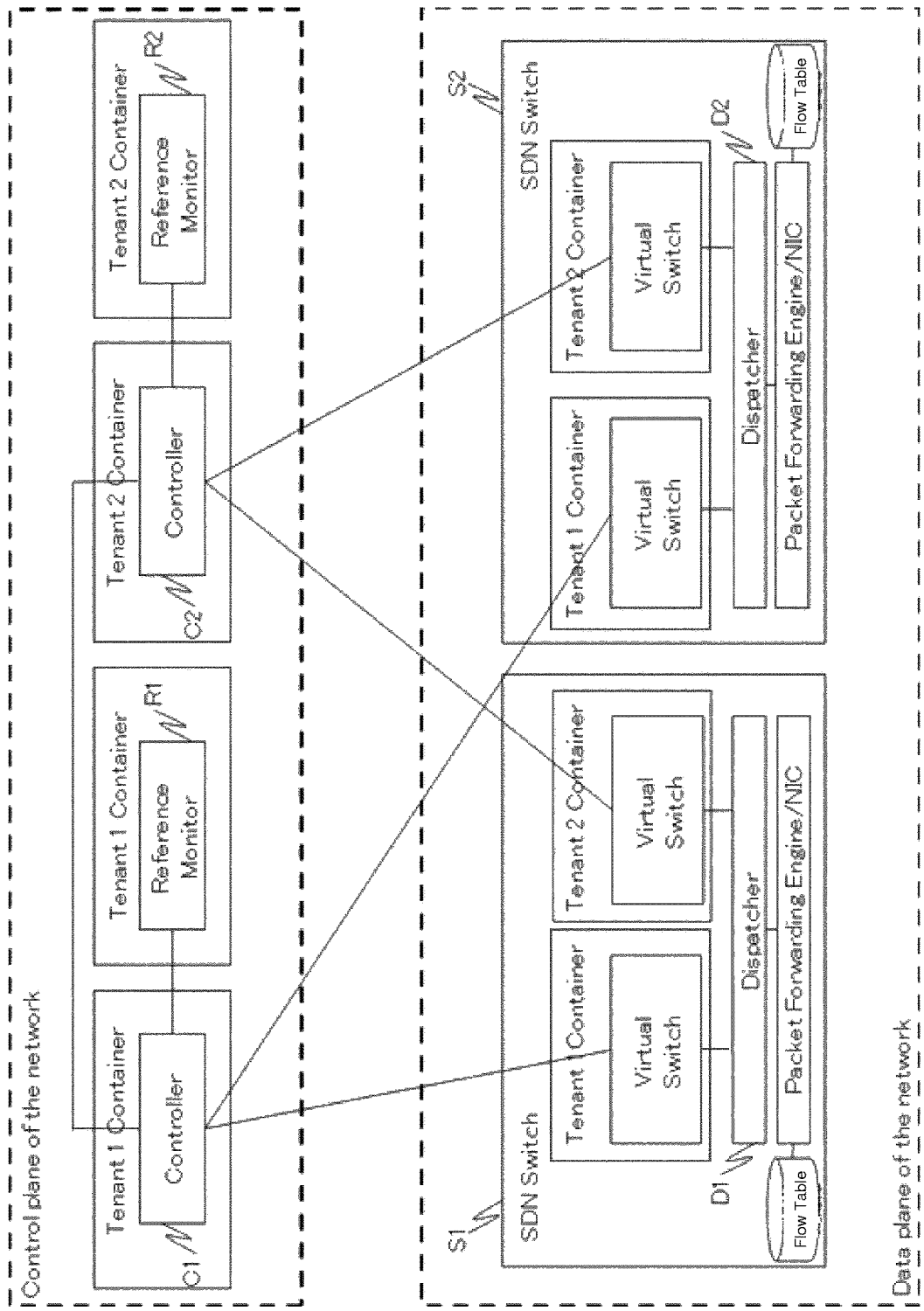
FIG. 1 shows a system according to an embodiment of the present invention.

One of the problems addressed by embodiments of the present invention is to enhance the security of configuration modifications in the network. A further problem addressed by embodiments of the present invention is to prevent installation of bogus and/or unused rules. One of the further problems addressed by embodiments of the present invention is to enhance the communication between controllers within the network.

An embodiment of the present invention provides a method for managing data traffic within a network, the network including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller An embodiment of the present invention provides a network for performing data traffic including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller.

Embodiments of the present invention provide a non-transitory computer readable medium storing a program causing a computer to execute a method for managing data traffic within a network, the network including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller.

Embodiments of the present invention provide a controller for controlling a part of a network, the network part including at least one forwarding element, 'FE', for forwarding data within the network, and wherein the controller is connectable to at least one reference monitor, 'RM' for enforcing a security policy for the network part managed by the controller.

Although applicable to any kind of network, the present invention will be described with regard to software defined networks SDN.

In an embodiment, the present invention provides a method for managing data traffic within a network, the network including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller, the method including the steps of:

a) Receiving a rule request by a controller and transmitting it to its RM,
b) Checking the rule request by the RM for policy compliance,
c) Authorizing the part of the rule request which is policy compliant by the RM, and Wherein when the rule request includes an outside modification, an outside modification impacting at least one other network part not managed by the controller,
d) The controller contacts at least the one or more controllers being impacted by the outside modification for obtaining an authorization for the outside modification,
e) Upon reception of the one or more authorizations for the outside modification, sending all modifications of the rule request and corresponding authorizations by the controller to all other controllers being impacted by the rule request for implementing the modification in their one or more forwarding elements.

In a further embodiment, the present invention provides a network for performing data traffic including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller, the controller being adapted to receive a rule request and to transmit it to its RM, wherein when the rule request includes an outside modification, an outside modification impacting at least one other network part not managed by the controller, the controller is adapted to contact the one or more controllers being impacted by the outside modification for obtaining an authorization for the outside modification, and upon reception of the one or more authorizations for the outside modification, to send all modifications of the rule request and corresponding authorizations to all other controllers being impacted by the rule request for implementing the modification in their one or more forwarding elements, and the RM being adapted to check the rule request for policy compliance and to authorize the part of the rule request which is policy compliant.

In a further embodiment, the present invention provides a non-transitory computer readable medium storing a program causing a computer to execute a method for managing data traffic within a network, the network including a plurality of controllers, each of the controllers controlling a part of the network, the network parts including at least one forwarding element, 'FE', for forwarding data within the network, and wherein each of the controllers is connected to at least one reference monitor, 'RM' for enforcing a security policy for the network part managed by the controller, the method including the steps of:

a) Receiving a rule request by a controller and transmitting it to its RM,
b) Checking the rule request by the RM for policy compliance,
c) Authorizing the part of the rule request which is policy compliant by the RM, and Wherein when the rule request includes an outside modification, an outside modification impacting at least one other network part not managed by the controller,
d) The controller contacts at least the one or more controllers being impacted by the outside modification for obtaining an authorization for the outside modification,
e) Upon reception of the one or more authorizations for the outside modification, sending all modifications of the rule request and corresponding authorizations by the controller to all other controllers being impacted by the rule request for implementing the modification in their one or more forwarding elements.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, video-tapes, CD-ROMs, DVD-ROMs, DVD-RAMs, DVD-RWs, HD-DVD-BluRay, DAT, MiniDisk, solid state disks SSD, floppy disks, SD-cards, CF-cards, SIM-cards, memory-sticks, USB-sticks, EPROM, EEPROM or the like.

The terms "computing entity", "computing device" or the like are to be understood in their broadest sense and refer in particular in the claims, preferably in the specification each to a device adapted to perform computing like a personal computer, a tablet, a mobile phone, a server, or the like including one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on the physical computing resource.

The terms "forwarding entity" or "forwarding element" are to be understood in their broadest sense and refer in particular in the claims, preferably in the description each to an entity adapted to perform computing like a personal computer, a tablet, a mobile phone, a server, or the like and includes one or more processors having one or more cores and may be connectable to a memory for storing an application which is adapted to perform corresponding steps of one or more of the embodiments of the present invention. Any application may be software based and/or hardware based installed in the memory on which the processor(s) can work on. The entities may be adapted in such a way that the corresponding steps to be computed are performed in an optimized way. For instance different steps may be performed in parallel with a single processor on different of its cores. Further, a plurality of same or different entities may be identical forming a single computing entity. The entity or entities may also be instantiated as a virtual entity running on a single or a plurality of physical computing resources. Different entities may therefore be executed on the physical computing resource. In particular, a forwarding entity or forwarding element is preferably adapted to receive data from an entity or device and forward, transmit, provide, etc. the received data in part or completely to another entity or device.

The terms "control request", "request" or "rule request" are to be understood in their broadest sense and refer in particular in the claims, preferably in the specification each to data or information in form of one or more instructions e.g. provided in form of packets, messages, etc. indicating, initiating, performing, executing, etc. a request for changing, applying, operating, amending, fetching, performing, executing, initiating, etc. of changes, operations or executions with regard to resources, computational resources, data, information, etc. or obtaining, acquiring, providing, etc. of information, data, values, parameters or the like. For instance, set-points of a service system are initiated to be changed by a control request. For instance, rules for forwarding or processing of data in a forwarding element are initiated to be changed or modified by a rule request. Even further, for instance information about rules for forwarding or processing of data in a forwarding element are initiated to be provided by a rule request.

The term "BLS" refers in particular in the claims, preferably in the specification to the Boneh-Lynn-Shacham signature scheme.

The term "data" is to be understood in its broadest sense and refers in particular in the claims preferably in the specification to any kind of data or information to be transmitted, used, applied, etc. within a network.

The term "network" is to be understood in its broadest sense and refers in particular in the claims, preferably in the specification to at least two entities being connected with each other, e.g. for communication, for providing a service, etc.

The term "controller" is to be understood in its broadest sense and refers in particular in the claims, preferably in the specification to a computing device or a computing entity being adapted to or having the purpose to perform, control, supervision, manage or the like another computing entity or device.

The terms "network part" or "network slice" are to be understood in their broadest sense and refer in particular in the claims, preferably in the specification to any kind of virtual or physical part, division or the like of the network having at least one entity within the parts.

The term "reference monitor" is to be understood in its broadest sense and refers in particular in the claims, preferably in the specification to any kind of computing device or computing entity being adapted to enforce, monitor, control, implement, amend, change, supervision, manage one or more policies, in particular security policies. The computing entity or computing device may be physically and/or virtually implemented within a controller or connected to a controller.

The term "policy" is to be understood in its broadest sense and refers in particular in the claims, preferably in the specification to any kind of data, information, etc. defining certain situations, scenarios, or the like which have to be fulfilled or which must not have to be fulfilled, applied, etc. A policy may be implemented, e.g. using logical comparisons, threshold comparisons with pre-defined parameters, or the like.

The term "authorization" or "authorizing" with regard to a "request" or a "rule request" are to be understood in their broadest sense and refers in particular in the claims, preferably in the specification to data, information, e.g. in form of one or more messages providing information enabling a verification of the request, the content of the request, information provided upon fulfilling the request or the like providing at least in part approval and/or disapproval of the request, the content of the request, information provided upon fulfilling the request. The message provided upon at least in part fulfilling the request being authorized may include additional information, e.g. about the authorizing entity or authorizing device.

The term "modification" or "modifying" with regard to "request" or "rule request" is to be understood in its broadest sense and refers in particular in the claims, preferably in the specification to any kind of amendment, altering, modification, change, or the like. In particular with regard to the term "rule" a modification could also include descriptions for reconfiguring a network at a higher abstraction level, e.g., they could include so-called intents. For instance the intent framework of the SDN controller ONOS allows one to specify that two hosts should be connected without providing details how the connection is realized at the data plane. Such a high-level intent is then compiled down e.g. by a controller to more fine-grained intents or to flow rules that can for instance be eventually be used to realize the requested connection.

The term "outside modification" is to be understood in its broadest sense and refers in particular in the claims, preferably in the specification with regard to a controller to one or more modifications impacting network elements, network devices or network entities not being under control or not controlled by the respective controller.

The term "impacting" in particular with regard to the term "outside modification" is to be understood in its broadest sense and refers in particular in the claims, preferably in the specification to any kind of change, amendment, altering of network functions, performance or the like in the most general sense.

The term "isolated" with regard to computing entities or devices is to be understood in its broadest sense and refers in particular in the claims, preferably in the specification to any kind of physical and/or virtual separation, e.g. a controller running in a container, e.g. a container as disclosed in the non-patent literature of T. Sasaki, A. Perrig, and D. E. Asoni. Control-plane isolation and recovery for a secure SDN architecture. In Proceedings of the 2nd IEEE Conference on Network Softwarization (NetSoft). IEEE Computer Society, 2016, such that a certain security guarantee is fulfilled.

The term "tree" in particular with regard to contacting other controllers is to be understood in its broadest sense and refers in particular in the claims, preferably in the specification to a physical or virtual structure or organization in general which is identical or similar to a tree. With regard to contacting other controllers, contacting other controllers follows a tree-like communication path starting from a controller initiating the contact—the "root"—by contacting all the "children" of the root wherein the children in turn—now seen as parent—contact their children, and so on.

The term "general binary tree" with regard to the term "tree" is to be understood in its broadest sense and refers in particular in the claims, preferably in the specification to a physical or virtual tree structure or tree organization of network elements or network entities wherein each parent entity has at least two children entities, wherein the leaves as well as the parent of the leaves might be excluded from the requirement of having at least two children.

The term "rollback" is to be understood in its broadest sense and refers in particular in the claims, preferably in the specification to any kind of method, procedure, algorithm performing undoing, providing a rollback, deleting prior amendments or restoring a former configuration, information, data or the like.

The term "aggregating" is to be understood in its broadest sense and refers in particular in the claims, preferably in the specification to any kind of combining, storing together, buffering, connecting, joining, merging or adding of information, data or the like, like messages, signatures, etc. For instance a received authorization request is aggregated with the one originating from its own reference monitor and was previously stored in a local memory buffer.

At least one embodiment may have at least one of the following advantages:
  security against misconfigurations;
  prevention of installation of bogus and unused rules;
  limiting the impact of a malfunctioning controller in re-configuring network parts it administrates; and
  enhancement of communication between controllers and/or reference monitors.

Further, the features advantages and further embodiments are described or may become apparent in the following:

The RMs may be running isolated from the controllers. This enhances the security: It does not suffice for an attacker to compromise a single container to obtain the full control of a network part. If the isolated reference monitor is compromised it can only blocked the controller by denying, e.g. all of its modification requests. If the isolated controller is compromised modifications still need to be policy compliant for example.

Step d may include performing of a commit-agree procedure. This further enhances the security for a communication with other controllers for obtaining authorization.

If a rule request includes only outside modifications the controller may drop the rule request. This enables an efficient handling: The controller does not have to handle modifications being out of scope of his control.

The controller may use for contacting one more or more controllers being impacted by the outside modification a general binary contact tree. The tree enables a minimization of the amount of information exchanged between the controllers by aggregating authorized requests.

The binary contact tree may be computed based on network domain parameters like link capacity or the like. This allows a computation of an efficient binary tree having the flexibility in terms of optimization of contacting other controllers to certain network parameters.

The controller may use for contacting the one or more controllers being impacted by the outside modification a fastest-node-first heuristic. This further enhances the efficiency enabling a more optimal resource distribution in heterogeneous network scenarios.

The binary contact tree may be checked for correctness by the RM. This enables in an efficient way to check the structure of the tree.

Authorization by a RM may be provided using a BLS signature. This enables, e.g. to aggregate homomorphically different authorized requests from children along a tree structure and to verify the correctness of the homomorphic aggregation. Thus, security is significantly enhanced.

An authorization may only be valid for a certain period of time. This enables to take into account asynchrony in the network.

In case a modification fails a rollback may be performed, which may be initiated by the controller initiating a rule modification. This enables an efficient handling if a modification fails to restore a previous network configuration.

In case of the number of controllers within the network being less than 10 then communication between the controllers is based on broadcasting and/or based on point-to-point. This enhances further the communication and an efficient use of computational resource systems then a binary tree does not have to be computed.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

FIG. 1 shows a system according to an embodiment of the present invention.

In FIG. 1 a network is shown including a control plane which includes multiple controllers and a data plane including software-defined network switches.

Each controller is managing a part of the network, e.g., a network slice or a virtualized network. The controllers are running in separated, isolated containers as e.g. shown in the non-patent literature T. Sasaki, A. Perrig, and D. E. Asoni. Control-plane isolation and recovery for a secure SDN architecture. In Proceedings of the 2nd IEEE Conference on Network Softwarization (NetSoft). IEEE Computer Society, 2016. Each controller further includes a reference monitor, as e.g. shown in the non-patent literature of F. Klaedtke, G. O. Karame, R. Bifulco, and H. Cui. Access control for SDN controllers. In Proceedings of the 3rd SIGCOMM Workshop on Hot Topics in Software Defined Networking (HotSDN). ACM Press, 2014 or F. Klaedtke, G. O. Karame, R. Bifulco, and H. Cui. Towards an access control scheme for accessing flows in SDN. In Proceedings of the 1st IEEE Conference on Network Softwarization (NetSoft). IEEE Computer Society, 2015 running in a container separated from its controller.

$C_1, C_2, \ldots, C_n$ denotes the controllers and $R_1, R_2, \ldots, R_n$ denotes the corresponding reference monitors. The controllers and reference monitors are isolated. This can be achieved e.g. by running them on separate machines or running them in virtualized environments on the same machine. The term container is used here to show that these components are isolated. The advantage of this is that it does not suffice for an attacker to compromise a single container to obtain full control of a network part. If the container of the reference monitor is compromised, it can only block the controller by denying all its modification requests. If the container of the controller is compromised, modifications still need to be policy compliant.

The network's data plane includes a plurality of switches S1, S2, ..., Sm. Each switch S1, S2, ... has a dispatcher and runs virtual switches, assigned to the network slices. The dispatcher of the switch Si is donated by Di. The virtual switches of switch Si are denoted by Si1, Si2, ..., Simi. Furthermore, each switch has a packet-forwarding engine and a flow table, in which the rules for forwarding network packets are stored.

The dispatcher as e.g. disclosed in the non-patent literature of T. Sasaki, A. Perrig, and D. E. Asoni. Control-plane isolation and recovery for a secure SDN architecture. In Proceedings of the 2nd IEEE Conference on Network Softwarization (NetSoft). IEEE Computer Society, 2016 has dispatch rules that specify flow spaces e.g., ranges of IP addresses, MAC addresses, or VLAN tags of tenants and virtual switch processes corresponding to relevant tenants. Using the dispatch rules, the dispatcher intermediates OpenFlow messages between a forwarding engine and the virtual switches. Specifically, the dispatcher receives an OpenFlow message from the packet forwarding engine, looks up the dispatch rules to determine which tenant the packet belongs to, and forwards the packet to the virtual switch. It also monitors the rules from the virtual switches to the packet forwarding engine and rejects rules which, e.g., break tenant isolation e.g., it prevents situations where a tenant switch sets up a flow of another tenant or are not authorized.

Not each controller has to be necessarily connected to each switch and not each tenant has necessarily a virtual switch in each switch.

In an embodiment controllers and reference monitors interact with each other to manage inter-tenant traffic in particular, and the administration of the network slices in general.

In detail the controllers can send modification requests to the switches/virtual switches. Such modifications request the reconfiguration of the network's data plane. For example, a requested modification can include multiple OpenFlow messages that request the installation or deletion of several flow rules, possibly at difference switches. Modifications are not limited to OpenFlow messages, for instance, in addition to OpenFlow messages, a modification could also include descriptions for reconfiguring a network at a higher abstraction level, e.g., they could include so-called intents. The intent framework of the SDN controller ONOS allows one to specify that two hosts should be connected without providing details how the connection is realized at the data plane. Such a high-level intent is then compiled down by a controller to more fine-grained intents or to flow rules that can be eventually be used to realize the requested connection.

Information requests about the data plane, e.g., the counter values of the installed flow rules in certain switches, are handled similarly to modification requests.

In addition to checking whether modifications or parts of it are policy compliant, the reference monitors can authorize modifications. However, a reference monitor can only authorize the parts of a modification that impact the network part that the respective controller administrates. That is, the reference monitor Ri can provide authorizations that authorize the parts of a modification that impact the network part that is administrated by the controller Ci. The parts of a modification that impact network parts that are controlled by a controller Cj, j being different from i need to be authorized by the reference monitor Rj.

The authorizations ensure the security of the network: In detail authorized requests provide unforgeable evidence that these requests have been checked and allowed by the corresponding reference monitor. Moreover, authorization provides a non-repudiable proof that a given reference monitor has approved/denied a given request. Besides providing authentication, these procedure steps help also in identifying malicious reference monitors that issue wrong or malicious authorizations in the network.

Whenever a switch Sk/virtual switch Skl receives a modification request from a controller Ci, the dispatcher Dk of the switch Sk checks the validity of the modification. Invalid received modifications are rejected by the dispatcher Dk and the switch Sk/virtual switch Skl sends a corresponding reply to the controller Ci. There are several reasons why a received modification can be invalid: for instance the modification or a part of it has not been authorized or is wrongly authorized, or the authorization of the modification is outdated. The modification of a valid request is forwarded by the dispatcher to the respective packet forwarding engine, which, e.g., installs, as requested, new rules in flow table of the switch Sk. The outcome of the modification success or failure is sent back by the dispatcher Dk to the controller Ci.

When the controller Ci, or a network application running on top of the controller Ci, requests a modification of the network configuration, for example, the application requests the installation of a network flow for connecting two hosts in the network. The flow rules F1, F2, ..., Fr should be installed in the flow tables of the switches at the network's data plane For establishing this network flow.

In detail the following steps are performed:
1. The controller Ci sends the modification request to reference monitor Ri.
    If the modification request only includes modifications that are outside of the controllers Ci's network part, it might immediately drop this request.
2. The reference monitor Ri checks whether the modification is policy compliant and authorizes it or parts of it.
    The reference monitor Ri sends its policy decision back to the controller Ci. In case the modification is not denied, corresponding authorization replies are also sent to the controller Ci. For the parts of the modification that are outside of the controller Ci's administrated network part, the reference monitor Ri cannot decide whether these parts are policy compliant, and it cannot provide a valid authorization replies for those. For those parts, the controller Ci needs to obtain the permission and the authorization replies from other controllers/reference monitors.
3. Depending on the reference monitor Ri's respond, the controller Ci may proceed as follows.
    a. If a part of the requested modification is denied, the controller Ci drops the modification.
    b. If all parts of the modification are permitted, the controller Ci sends a modification request, including the authorizations from the reference monitor Ri, to the switches.
    c. If the reference monitor Ri could not decide on one or more parts of the modification, the controller Ci runs an agree-commit protocol e.g. based on BLS signatures to obtain the permissions and authorizes from the other controllers/reference monitors.
        i. Ci contacts the other controllers by using binary contact tree enhancing efficiency. This tree minimizes the amount of information exchanged between the controllers by aggregating authorized requests homomorphically. In particular, it minimizes the bandwidth usage of each controller for the communication between the controllers. Finally, the tree may use domain knowledge, such as link capacity, in order to optimize the performance of information delivery within the tree.

ii. The controller Ci receives the response from the other controllers. In case one or more parts of the modification are denied or not authorized, the controller Ci drops the modification, cf. step 3a. Otherwise, the requested modifications, including their authorizations are sent to the controllers. Each controller sends the modification parts and their authorizations to the corresponding switches/virtual switches. A controller might renew an authorization in case it timed out. In this case, the controller contacts again its reference monitor, where the modification is also again checked for policy compliance.

iii. The switches process the requested modifications and respond with the outcome. Note that the authorizations' validity is checked by the switches' dispatchers.

4. In case any of the above steps fail in a given domain, the controller of the domain calls for a rollback action by informing directly the controller Ci.

Figure 2:
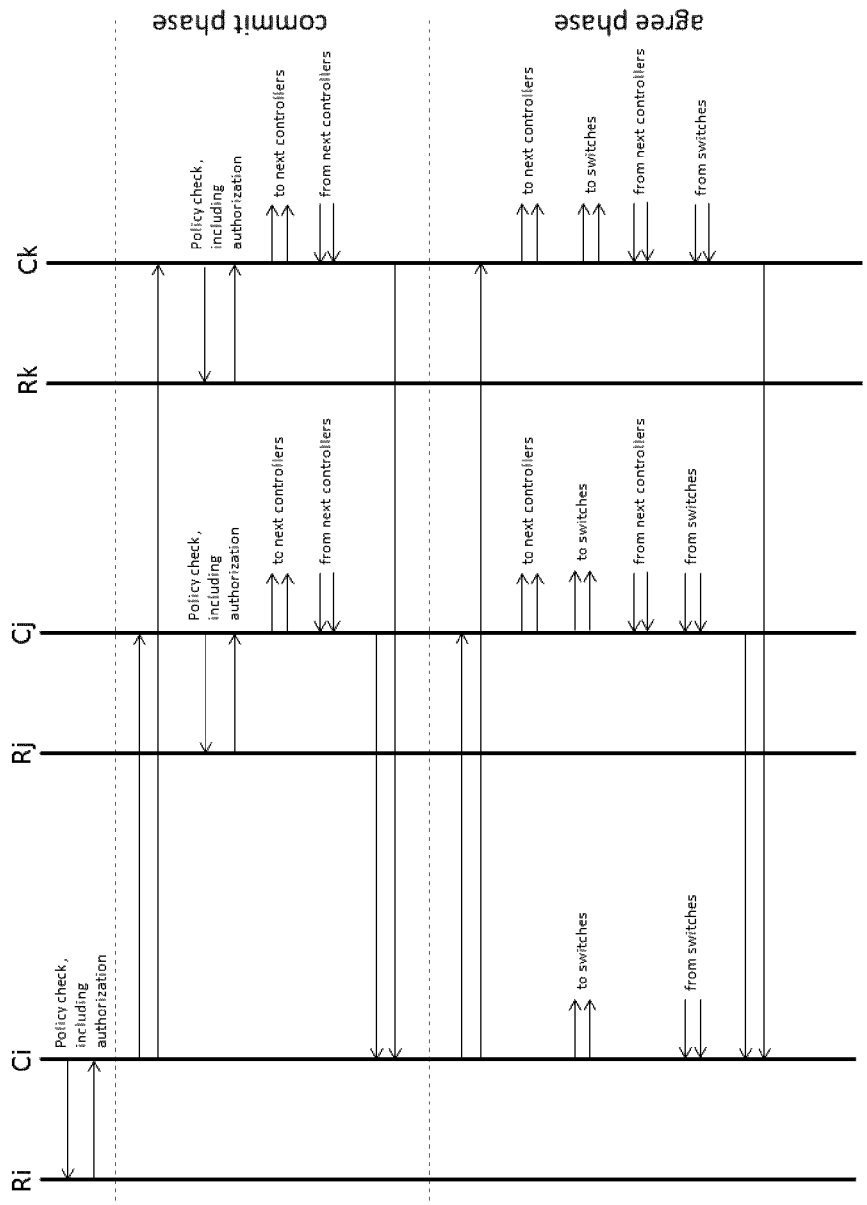
FIG. 2 part of steps of a method according to an embodiment of the present invention.

FIG. 2 illustrates the exchange of the corresponding messages.

FIG. 2 shows part of steps of a method according to an embodiment of the present invention.

In FIG. 2 exchange of messages at the control plane in the commit-agree protocol when using the contact tree is shown. It is assumed that all modification requests are policy compliant and authorized. Furthermore, no controller renews already authorized requests and all modifications succeed at the switches i.e. no rollback is performed.

Figure 3:
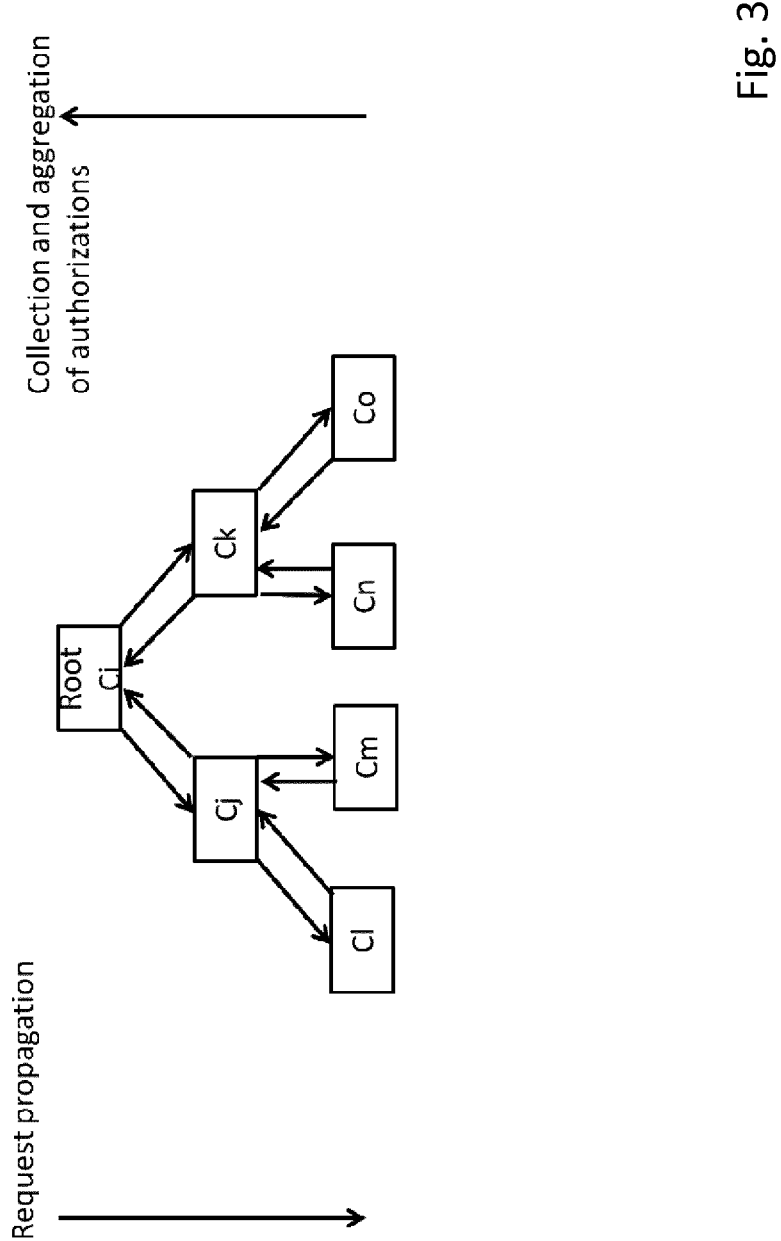
FIG. 3 shows an example of a contacting tree together with part steps of a method according to an embodiment of the present invention.

FIG. 3 shows an example of a contacting tree together with part of steps of a method according to an embodiment of the present invention.

In FIG. 3 an example of a contact tree including seven controllers is shown. The request propagation process occurs on the path from the root to the leave nodes. On the other hand a collection and aggregation of authorizations occur on the path from the leaves to the root.

In the following due to possible asynchrony in the network, a global timeout value is applied, known to all entities in the network. Authorized requests are only valid for a period of time which is in particular strictly smaller, e.g. a factor of 10, preferably a factor of 25 smaller, than the timeout from the time when they are issued.

When the number of controllers is small, all communication between controllers to gather and distributed authorized requests can be performed by simple information broadcasting in the network or using basic point to point communication between the controllers. In an embodiment the communication overhead between controllers is minimized in case the network includes a large (e.g., more than three) number of controllers. In FIG. 3 a specifically designed binary tree, more generally, a tree where an internal node has at least two children here in found a contact tree including 7 controllers is shown: The request propagation process occurs on the path from the root to the leave nodes. On the other hand, the collection and aggregation of authorizations occur on the path from the leaves to the root, here, a request is not broadcasted to the entire list of reference monitors. Instead, the originator first builds a binary contact tree and forwards the request only to its children in the tree.

In turn, these nodes ask the reference monitors of their respective domains to authorize the request. If the reference monitor successfully authorizes the request, the nodes buffer the authorized request in their local memory and only forward the original message sent by the originator. The reference monitors may also check that the contact tree is correctly built and contains all the controllers that should be involved in this process. If, on the other hand, the reference monitors do not authorize the requests, their respective controllers do not forward the original request in the contact tree and instead inform the sender of the request that the request has been denied in their domain.

This procedure iterates among controllers until either:
1—The leaf nodes in the contact tree are reached.
2—One intermediate node in the contact tree does not permit rule installation in its domain.

In the first case, the leaf nodes forward the authorized requests obtained from their respective reference monitors back to their parent in the tree. The parent node homomorphically aggregates the received authorization request with the one originating from its own reference monitor and was previously stored in a local memory buffer and forwards the message back to its parent in the tree. This process iterates until the root of the tree, i.e. the original requester receives the aggregated authorization requests from both its children. In this case, the root aggregates both authorized requests and proceeds as discussed in the next paragraph.

The contact tree can be built using some domain knowledge in order to further optimize information exchange among reference monitors in the network. For instance, the reference monitors can rely on the Fastest-Node First (FNF) heuristic. In the non-patent literature of M. Banikazemi, V. Moorthy, and D. K. Panda. Efficient collective communication on heterogeneous networks of workstations. In Proceedings of the International Conference on Parallel Processing (ICPP). IEEE Computer Society, 1998 it was shown that any optimal resource distribution solution in heterogeneous settings is NP-hard and that the FNF heuristic is a near-optimal solution that minimizes the average completion time, and produces a 1.5 approximation for minimizing the maximum completion time. According to an embodiment, the originator first chooses to send the request to the two controllers with the highest upload and so on. To this end, it is assumed that the upload link capacity of the controllers is available to the request originator.

In the following in detail the steps for authorizing requests and aggregating authorized requests is shown. In the sequel the originator's request is denoted by M. To authorize M, BLS signatures are used since these result in compact signatures (e.g. 224-bit signatures). Namely, upon reception of M, the corresponding reference monitor R1 issues the following authorized request:

$Sig_{R1}=(M, T, R1)_{BLS}$ using his private BLS key. Here, T is a timestamp.

Further BLS signatures are message and key homomorphic. This enables a node to aggregate different authorized requests homomorphically and to verify the correctness of the homomorphic aggregation as shown in the non-patent literature of F. Armknecht, L. Barman, J.-M. Bohli, and G. O. Karame. Mirror: Enabling Proofs of Data Replication and Retrievability in the Cloud. In Proceedings of the 25th USENIX Security Symposium (USENIX Security). USENIX Association, 2016.

The commit phase ends when the controller Ci that initiated the modification request receives the answers from the two controllers at the children at the contact tree's root. In case the reference monitor of a controller denied the modification of the controller's network part, the modification request is dropped. The modification is also dropped by Ci if the modification request is, e.g., not or wrongly authorized.

Otherwise, i.e., all controllers permitted and authorized the modifications of their network parts, the controller Ci starts the agree phase of the commit-agree protocol. Here, again using the contact tree, the controller Ci contacts the controllers to perform the requested modification. All controllers, including Ci, forward their relevant parts of the modification request, including the authorizations, to the respective switches. Recall that a controller can contact its reference monitor to renew an authorization, which might be necessary because of time outs.

In case a modification fails or parts of it, the controller that requested the modification starts a rollback. Some parts of a requested modification might have succeeded and need to be undone because of the overall failure. The rollback should bring the network in a stable, well-defined state. The rollback might also involve other controllers.

For a rollback the controller Ci that initiated the modification request uses again the contact tree to contact the controllers. It is augmented with a rollback. The augmented contact tree can be authorized by the reference monitor Ri and checked by the other reference monitor of the other controllers. The controllers perform the required modification to undo their changes.

In a further embodiment the present invention provides a method for checking policy compliance of accessing/reconfiguring data plane components of an SDN network, where the network is administrated by multiple controllers, including the steps of:

1) The controller is triggered (for instance, by an application or by a switch) to install a given rule in the network.
2) Reference monitors are contacted by controllers to check policy compliance of modification requests and authorizing such requests, or parts of them.
3) Execution of a commit-agree protocol between controllers for a modifications request. This includes the building and checking of a contact tree to minimize communication overhead. Contact trees are built by controllers and checked by reference monitors. Reference monitors can also be involved in the execution of the commit-agree protocol to renew authorizations.
4) Checking of authorizations of the modification request by the switches/dispatcher of the switches. Reporting of the outcome of the modification to the controllers.
5) In case of a failure, each controller performs a rollback. It also informs the other controllers to rollback, where again the contact tree is used to minimize communication.

At least one embodiment of the present invention may provide or enable 1) a decentralized and eventually consistent protocol based on hierarchical reference monitor architecture to protect against network misconfigurations in multi-domain networks while ensuring full isolation of the reference monitors, the controllers, and the various network components.
2) time-based authorized requests that originate from reference monitors as a one-time cryptographic token which allows the dispatcher and the controller to install a given flow rule in a domain.
3) a specifically crafted contact tree to minimize the communication overhead among reference monitors and to homomorphically aggregate authorization requests in the network, thus further reducing communication overhead.

In summary at least one embodiment of the present invention may have at least one of the following advantages:

At least one embodiment of the present invention ensures that all multi-domain rules that are installed in any domain are useful and prevents the installation of bogus and/or unused rules. Moreover, at least one embodiment of the present invention limits the impact of a malfunctioning controller in reconfiguring the network part it administrates by allowing controllers and reference monitors to interact with each other in order to manage inter-tenant traffic in particular, and the administration of the network slices in general. Even further at least the embodiment of the present invention enhances the communication between controllers and the reference monitors by relying on specifically designed contact trees for aggregating and delivering authorized modification requests.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing data traffic within a network, the network comprising a plurality of controllers, each of the controllers being configured to control a corresponding part of the network comprising at least one forwarding element (FE) for forwarding data within the network, and wherein each of the controllers is connected to at least one reference monitor (RM) for enforcing a security policy for the network part managed by the corresponding one of the controllers, the method comprising:
- a) receiving a rule request by a controller of the controllers and transmitting the rule request to the corresponding RM,
- b) checking, by the RM, the rule request for policy compliance,
- c) authorizing, by the RM, a part of the rule request that is policy compliant, and
- wherein when the rule request comprises an outside modification, the outside modification impacting at least one other network part not managed by the controller:
- d) the controller contacts at least the one or more controllers being impacted by the outside modification for obtaining an authorization for the outside modification, and
- e) upon reception of the one or more authorizations for the outside modification, sending all modifications of the rule request and corresponding authorizations by the controller to all other controllers being impacted by the rule request for implementing the modification in the corresponding at least one FE of each of the controllers impacted.

2. The method according to claim 1, wherein the at least one RM of each of the controllers is running isolated from the controllers.

3. The method according to claim 1, wherein step d comprises performing of a commit-agree procedure.

4. The method according to claim 1, the method comprising, based upon the rule request comprising only outside modifications, the controller drops the rule request.

5. The method according to claim 1, wherein the controller uses a general binary contact tree for contacting the one or more controllers being impacted by the outside modification.

6. The method according to claim 5, wherein the general binary contact tree is computed based on network domain parameters.

7. The method according to claim 5, wherein the controller uses a fastest-node-first heuristic for contacting the one or more controllers being impacted by the outside modification.

8. The method according to claim 5, wherein the general binary contact tree is checked for correctness by the RM.

9. The method according to claim 1, wherein the authorization by the RM is provided using a BLS signature.

10. The method according to claim 1, wherein the authorization is only valid for a predefined period of time.

11. The method according to claim 1, wherein in a case where the modification fails, a rollback is performed.

12. The method according to claim 1, wherein in a case where a number of controllers within the network is less than 10, then communication between the controllers is based on broadcasting and/or based on point-to-point.

13. The method of claim 1,
- wherein the FE operates in a data plane of the network,
- wherein the RM and the controller operate in a control plane of the network,
- wherein a rule request comprises at least one of a request for installing, modifying, or deleting a data flow rule in the FE.

14. A network for performing data traffic, the network comprising:
- a plurality of controllers, each of the controllers controlling a corresponding part of the network comprising at least one forwarding element (FE) for forwarding data within the network, and wherein each of the controllers is connected to at least one reference monitor (RM) for enforcing a security policy for the network part managed by the corresponding one of the controllers,
- wherein a controller of the plurality of controllers is adapted to receive a rule request and to transmit the rule request to the corresponding RM,
- wherein when the rule request comprises an outside modification, the outside modification impacting at least one other network part not managed by the controller,
- wherein the controller is adapted to contact at least the one or more controllers being impacted by the outside modification for obtaining an authorization for the outside modification, and upon reception of the one or more authorizations for the outside modification, to send all modifications of the rule request and corresponding authorizations to all other controllers being impacted by the rule request for implementing the modification in the corresponding FE of the controllers impacted, and
- wherein the RM is adapted to check the rule request for policy compliance and to authorize a part of the rule request which is policy compliant.

15. A non-transitory computer-readable medium storing a program causing a computer to execute a method for managing data traffic within a network, the network comprising a plurality of controllers, each of the controllers being configured to control a corresponding part of the network comprising at least one forwarding element (FE) for forwarding data within the network, and wherein each of the controllers is connected to at least one reference monitor (RM) for enforcing a security policy for the network part managed by the corresponding one of the controllers, wherein the method comprises:
- a) receiving a rule request by a controller of the controllers and transmitting the rule request to the corresponding RM,
- b) checking, by the RM, the rule request for policy compliance,
- c) authorizing, by the RM, a part of the rule request that is policy compliant, and
- wherein when the rule request comprises an outside modification, the outside modification impacting at least one other network part not managed by the controller:
- d) the controller contacts at least the one or more controllers being impacted by the outside modification for obtaining an authorization for the outside modification, and
- e) upon reception of the one or more authorizations for the outside modification, sending all modifications of the rule request and corresponding authorizations by the controller to all other controllers being impacted by the rule request for implementing the modification in the corresponding at least one FE of each of the controllers impacted.

16. A controller for controlling a part of a network, the network part comprising at least one forwarding element (FE) for forwarding data within the network,
- wherein the controller is connectable to at least one reference monitor (RM) for enforcing a security policy for the network part managed by the controller,
- wherein the controller is adapted to receive a rule request and to transmit the rule request to the RM, wherein when the rule request comprises an outside modification, the outside modification impacting at least one other network part not managed by the controller, the controller is adapted to contact at least one or more other controllers of the network being impacted by the outside modification for obtaining an authorization for the outside modification, and upon reception of the one or more authorizations for the outside modification, to send all modifications of the rule request and corresponding authorizations to all other controllers being impacted by the rule request for implementing the modification in one or more forwarding elements of the controllers impacted.

17. The method of claim 13, wherein the network is a software defined network, and the FE is a software defined network switch.

* * * * *